United States Patent [19]
Schaefer

[11] 3,839,924
[45] Oct. 8, 1974

[54] PARKING BRAKE CONTROL MECHANISM
[75] Inventor: Ernest D. Schaefer, Xenia, Ohio
[73] Assignee: General Motors Corporation, Detroit, Mich.
[22] Filed: July 25, 1973
[21] Appl. No.: 382,464

[52] U.S. Cl............................ 74/523, 74/517, 74/518
[51] Int. Cl............................................... G05g 1/04
[58] Field of Search............ 74/517, 518, 519, 523, 74/516

[56] References Cited
UNITED STATES PATENTS
3,780,599   12/1973   Schaefer.......................... 74/518 X

*Primary Examiner*—Samuel Scott
*Assistant Examiner*—Frank H. McKenzie, Jr.
*Attorney, Agent, or Firm*—D. D. McGraw

[57] ABSTRACT

A parking brake apply and release mechanism utilizing a cam arrangement to generate an increasing brake apply force ratio as the parking brake is applied. The mechanism incorporates an arrangement whereby the brake is retained in the applied position while the apply handle is returned to a rest position, further movement of the handle beyond the rest position actuating a release mechanism which releases the brake. An ignition interlock prevents the vehicle ignition system from being deenergized until the brake apply mechanism is moved from the rest position.

6 Claims, 5 Drawing Figures

PARKING BRAKE CONTROL MECHANISM

The invention relates to a parking brake apply and release mechanism and more particularly to one which is actuated in a push-pull manner. It is a feature of the invention that the parking brake may be applied and the handle may be returned to a rest position so that it does not have to extend unduly into the passenger compartment so long as the brake is applied. It is another feature of the invention that the handle may be pushed further inwardly to actuate a release mechanism to release the parking brake.

The mechanism incorporates a cam arrangement including a generally linear cam surface on a fixed support member, a curvilinear cam surface on a ratio generating lever which is pivoted to the fixed support, cam followers on an input bar or lever to which the handle is attached for push-pull movement of the cam followers, the cam followers respectively engaging the cam surfaces to move the pivoted lever to operatively apply the parking brake through an additional lever and a cable. It is a feature of the invention that an ignition interlock system may be provided which will prevent the vehicle ignition from being energized while the parking brake actuating mechanism is in the rest, or brake release, position. Another feature of the invention includes provision for releasing the parking brake by action involving pushing the handle and input bar beyond the rest position in the direction opposite the brake apply direction so as to release a pawl and ratchet arrangement.

Figure 1:
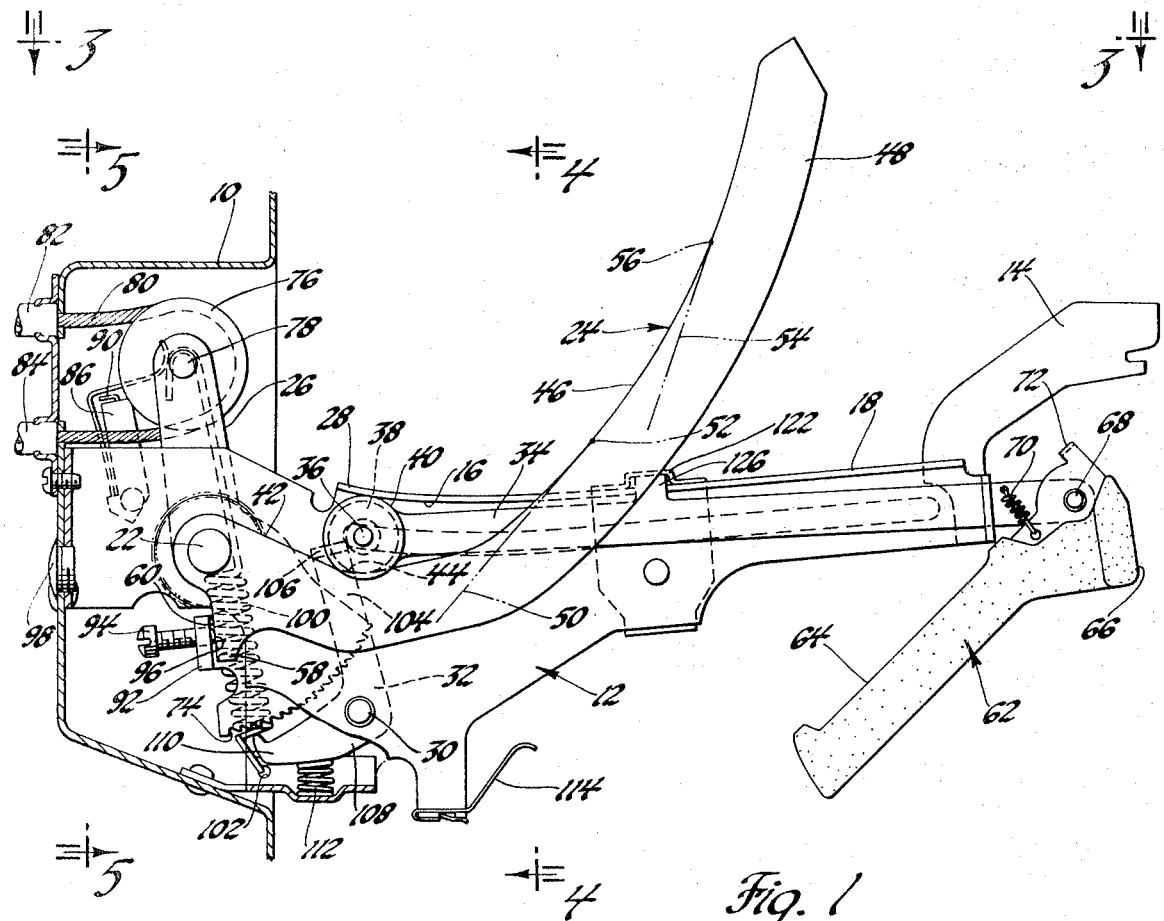
FIG. 1 is an elevation view of a parking brake control mechanism embodying the invention as installed in a vehicle, with parts broken away and in section, and showing the mechanism at the rest position.
Figure 2:
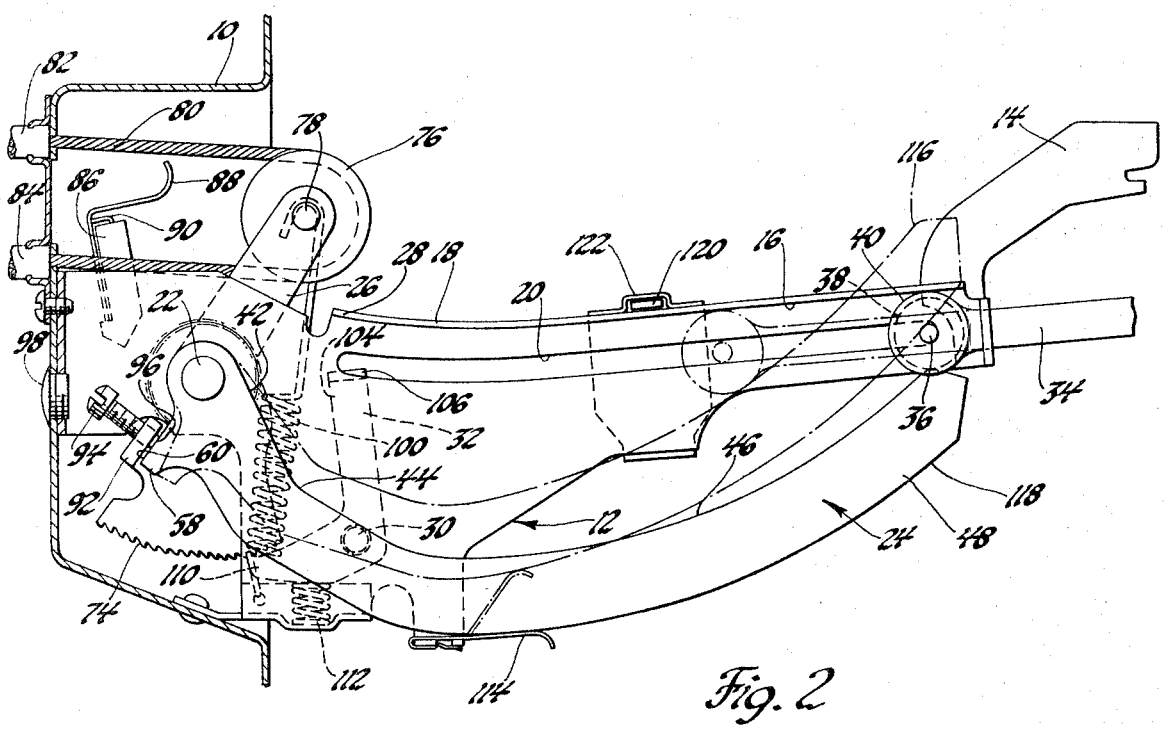
FIG. 2 is a view similar to FIG. 1 and illustrates the mechanism as the brake is applied.
Figure 3:
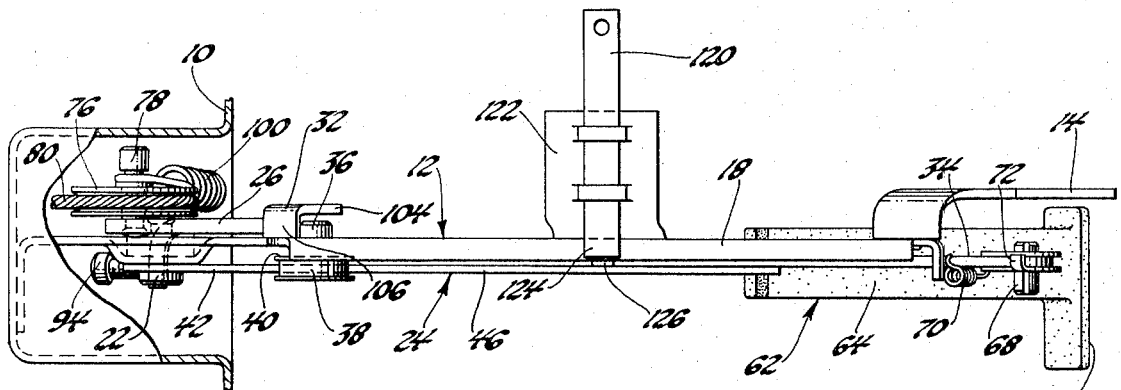
FIG. 3 is a plan view of the mechanism taken in the direction of arrows 3—3 of FIG. 1.
Figure 4:
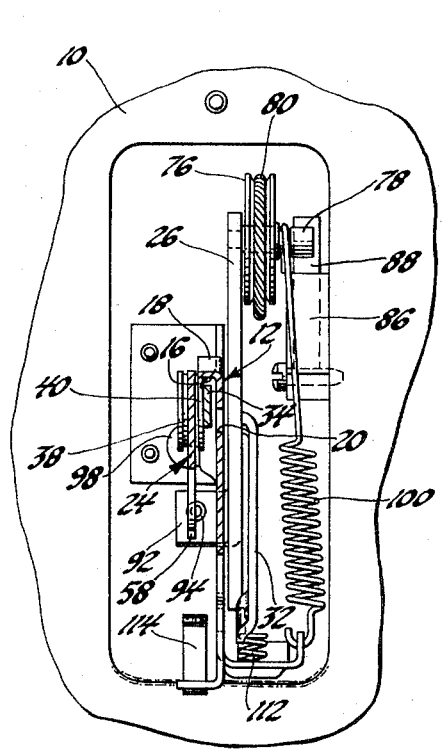
FIG. 4 is a cross-section view of the mechanism taken in the direction of arrows 4—4 of FIG. 1.
Figure 5:
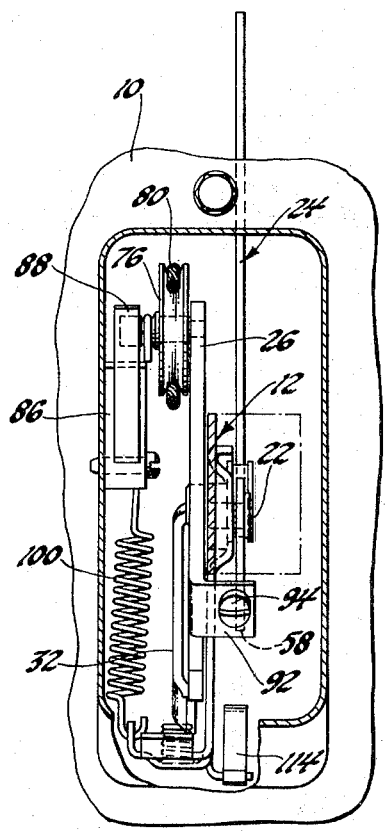
FIG. 5 is a cross-section view of the mechanism taken in the direction of arrows 5—5 of FIG. 1.

The parking brake mechanism is shown in the drawings as being mounted in an automotive vehicle on the vehicle fire wall 10 and other suitable portions of the vehicle such as the instrument panel support, not shown. The mechanism includes a fixed support 12 which is secured to the fire wall 10 and has a mounting bracket 14 attached to secure the after end of the fixed support to the instrument panel support or other suitable portions of the vehicle. A generally linear cam surface 16 is formed by the underside of a flange 18 formed as a part of the fixed support 12. A slot 20 is formed in the main body of the fixed support 12 and is parallel to but spaced from the cam surface 16. The forward end sections of the cam surface 16 and the slot 20 are preferably curved slightly upward as seen in FIGS. 1 and 2.

A pivot pin 22 pivotally attaches a cam lever 24 and an output lever 26 to the forward portion of the fixed support 12 and between the forward end 28 of flange 18 and the forward end of the fixed support. Another pivot pin 30 pivotally secures a lock and release lever 32 to the fixed support 12 at a point in spaced relation to the pivot pin 22 and flange 18. An input bar 34 is a push-pull lever mounted on the fixed support 12 so that it may be moved genrally linearly in fore and aft directions. The forward end of the input bar 34 has a cam follower shaft 36 which extends through slot 20 so as to guide the forward end of the input bar. A pair of cam followers comprising an inner cam follower roll 38 and an outer cam follower roll 40 are independently rotatably mounted on the cam follower shaft 36 so that the outer periphery of the outer cam follower roll 40 engages the cam surface 16 throughout the range of movement of the input bar 34.

The cam lever 24 has a first cam section 42 formed on one edge thereof from a point adjacent pivot pin 22 to a rest position or point 44. The cam surface continues in a direction away from pivot pin 22 from rest position 44, providing a second cam surface section 46. The cam surface section 46 is formed on the cam lever arm 48 of cam lever 24 and is defined by a curve having tangents thereto increasing in their closest points of approach to the axis of the cam lever pivot pin 22 as the distance of the tangent points on the curve increases from the axis of the cam lever pivot pin 22, such tangents passing on the opposite side of the axis of the cam lever pivot pin from a line extension of the generally linear cam surface 16. This may be more easily visualized by noting that the tangent line 50 touching cam surface 46 at curve point 52 bears the described relationship to another tangent line 54 touching cam surface 46 at curve point 56, point 56 being further away from the axis of pivot pin 22 than is point 52. The desired variable apply ratio of the parking brake is defined in major part by the nature of the curve cam surface section 46. Cam surface section 42 extends from the rest point 44 so that it passes on the same side of the axis of pivot pin 22 as does a line extension of the generally linear cam surface 16. Cam follower roll 38 rolls on cam surface section 42 when the mechanism is being released, as described below.

The cam lever 24 has another arm 58, one edge of which provides a force transfer surface 60. This surface cooperates with a portion of the output lever 26 in a manner to be later described.

The inner cam follower roll 38 engages the cam surface of cam lever 24 in camming relation, and is slightly smaller in diameter than the outer cam follower roll 40 so that the outer cam roll acts as a flange keeping the cam rolls in proper alignment with the cam lever cam surface.

The aft end of input bar 34 is slidably supported and guided by a pair of the fixed support 12 and has a handle assembly 62 pivotally secured thereto so as to be accessible to the vehicle operator. The handle assembly includes a hand grip 64, a push surface 66, a pivot pin 68 which pivotally attaches the handle to input bar 34, a tension spring 70 which urges the hand grip to the position shown in FIG. 1 for storage, and a stop tab 72 which limits pivotal movement of the hand grip about pivot pin 68 when the operator pulls the hand grip rearwardly. Such rearward handle movement causes the handle to pivot against the force of spring 70 until the stop tab engages the edge of the input bar 34. Further rearward movement of the hand grip by the operator causes the input bar 34 to move rearwardly to actuate the parking brake as will be described.

The output lever 26 has a toothed gear quadrant or ratchet 74 formed on one end thereof, the output lever being pivoted on pivot pin 22 intermediate its ends.

The opposite end of the output lever has a pulley 76 rotatably mounted thereon by pivot pin 78. The parking brake tensioning cable 80 passes around pulley 76 and through guides 82 and 84 in the firewall 10 so that when the output lever is pivoted clockwise, as seen in FIG. 1, the cable 80 is tensioned to apply the vehicle parking brake. A parking brake light switch 86 has a switch arm 88 and a contact 90 so arranged that, when the mechanism is in the release position shown in FIG. 1, the pivot pin 78 holds the switch arm 88 away from contact 90. However, when the output lever 26 is moved clockwise, switch arm 88 is permitted to move into engagement with contact 90, closing the switch and arming the parking brake light circuit.

The side of output lever 26 between pivot pin 22 and toothed quadrant 74 is provided with a tab 92 in which an adjuster screw 94 is mounted to provide a force transfer surface 96 which is engageable with the force transfer surface 60 of the cam lever 24. This engagement is such that force is transmitted between the surfaces only in compression. The fire wall is provided with an access port and port cover 98 through which, when the cover is removed, the screw may be adjusted.

A tension spring 100 has one end hooked over pivot pin 78 and the other end hooked into a hole 102 provided in fixed support 12 so that the spring is positioned between pivot pin 22 and the forward end 28 of flange 18. The spring therefore urges the output lever 26 toward clockwise rotation on pivot pin 22 as seen in FIGS. 1 and 2. The spring does assist in applying the parking brake against the tension in the brake cable 80, moving from an almost over-center position when the brake is released to a greater force-exerting position as the brake is applied. This can be seen by comparing FIGS. 1 and 2.

The lock and release lever 32 is centrally pivoted on pin 30 and has one arm 104 extending generally upwardly, the outer end being bent to form a tab 106 which is engageable with the cam follower shaft 36 when the brake mechanism is being released. This engagement occurs when the input bar 34 has been pushed forwardly beyond the rest position.

The other arm 108 of lever 32 extends generally parallel to the arc on which the toothed quadrant 74 is formed and terminates in a pawl 110 which is engageable with the toothed quadrant 74 when the lever 32 pivots clockwise as seen in FIGS. 1 and 2 about pin 30. A compression spring 112 is mounted on a part of the fixed support 12 and engages lever arm 108 so as to urge pawl 110 toward engagement with teeth of the toothed quadrant 74.

A leaf spring 114 is fixed to a part of support 12 so that it can engage the lower edge of cam lever 24 as the brake is applied beyond a predetermined point, the spring urging the cam lever against its own weight so as to hold it in the lever position 116 after the brake has been applied and the handle moved forwardly toward the stored position. This assures the removal of the outer end of the cam lever 24 from the position occupied by the hand grip 64 when the handle assembly is moved to the stored position, thereby preventing any interference at this point which could cause undesirable noises. As can be seen in FIG. 2, full brake application by full rearward movement of the input bar 34 can move cam lever 24 clockwise to the lever position 118, in which the spring 114 is fully extended, and the ouput lever 26 has been moved clockwise to the maximum extent, thereby providing the maximum available tension on the brake apply cable 80.

An ignition interlock bar 120 is slidably guided by guide bracket 122, which is secured to fixed support 12. The end 124 of bar 120 terminates immediately adjacent the plane of the input bar 34. A tab 126 formed on input bar 34 is aligned with the end 124 of bar 120 when the mechanism is in the rest position shown in FIG. 1. Bar 120 is so connected by suitable means to the vehicle ignition control system that it must move through the plane of input bar 34 before the vehicle ignition can be turned off. Therefore, input bar 34 must be moved rearwardly so that tab 126 is clear of the area necessary to move bar 120. When the vehicle operator applies the parking brake by pull of the input bar 34 rearwardly, tab 126 is moved out of the way and the ignition can be turned off.

In operation, the mechanism is initially at the rest position shown in FIG. 1 and it is assumed that the vehicle is running. After stopping the vehicle, the operator grips and pulls on the hand grip 64, pivoting it counterclockwise against the force spring 70 until stop tab 72 engages the edge of the input bar. Further movement of the hand grip rearwardly causes input bar 34 to slide rearwardly, moving tab 126 to clear bar 120. The cam followers 38 and 40 therefore rotate on shaft 36, the outer cam follower rolling against cam surface 16 and the inner cam follower rolling against cam surface 46. This causes a clockwise pivotal movement of cam lever 24 about pivot pin 22 toward lever position 116 of FIG. 2. Pawl 110 ratchets over the teeth of quadrant 74, allowing the output lever 26 to be rotated clockwise as compression force at an increasing ratio is transferred through surface 60 of cam lever arm 58 to surface 96 of the adjuster screw on output lever 26. This movement is assisted by the tension in spring 100 as the output lever 26 pivots. Switch contact 90 is engaged by switch arm 88 as the pulley pivot pin 78 moves away from the switch arm, arming the brake line circuit. Cable 80 is tensioned, equalizing action being obtained by the use of pulley 76 so that each portion of cable 80 which passes through guides 82 and 84, respectively, has the same tension. The cable ends are suitably connected to the vehicle parking brake mechanisms at the vehicle wheel brakes and the brakes are therefore applied.

The mechanical ratio varies in an increasing manner as the brake is applied as the inner cam follower 38 moves along cam surface 46 due to the shape of the cam surface. After the operator has pulled the input bar sufficiently rearwardly, the cam lever 24 will engage the end of spring 114 at position 116. Any further rearward movement of the input bar will force lever 24 further downwardly against spring 114, with lever position 118 being the limiting position. Since pawl 110 is engaged with teeth of quadrant 74, it holds the brake in the applied position. The operator then moves the handle assembly forwardly and may push on push surface 66 until the input bar and the cam followers are returned to the rest position shown in FIG. 1. However, spring 114 will lift cam lever 24 only to the lever position 116 shown in FIG. 2. This will give sufficient handle clearance for the handle assembly to be placed in the storage position.

When the operator desires to release the brake mechanism, he pushes forwardly against push surface 66, moving the input bar 34 farther forwardly, causing the cam follower shaft 36 to move forwardly in slot 20 until it engages the tab 106 of the lock and release lever 32. Further forward movement pivots lever 32 counterclockwise against the force of spring 112, removing pawl 110 from engagement with toothed quadrant 74. The tension on brake cable 80 then moves the output lever 26 counterclockwise as seen in FIGS. 1 and 2 to the brake release position. This cable tension decreases as it is released. However, it is sufficient to overcome the tension of spring 100 since this spring also moves toward, but not to, an over-center position, therefore effectively decreasing the force that it exerts which opposes the cable tension. When the operator releases the force against push surface 66, spring 112 moves lever 32 clockwise and also moves cam follower shaft rearwardly, therefore returning the cam followers and the input bar 34 to the rest position.

Should the operator move the input bar 44 forwardly from the rest position while the brake is released, he will have not only the resistance of spring 112 to overcome but also the resistance against tensioning of the cable 80. This occurs since the inner cam follower 38 will roll on cam surface 42 while the outer cam follower will roll on the end of cam surface 16 adjacent flange end 28. These surfaces are so formed that this movement will cause slight clockwise rotation of cam lever 24, therefore tending to tension cable 80. Thus there is additional resistance to movement of the mechanism from the rest position when the brake mechanisn is released, therefore keeping tab 126 positioned so as to block the movement of bar 120 unless the brakes are applied.

What is claimed is:

1. A parking brake control mechanism comprising:

a linearly movable input bar having first and second independently rotatable cam followers mounted on one end and a handle mounted on the other end;

a fixed bracket having guide means for said bar and a linear cam engaging one of said cam followers;

a cam lever pivoted on said fixed bracket and having a cam lever arm extending from the pivot thereof in a plane also having the other of said cam followers therein throughout the range of linear movement of said other cam follower, said cam lever arm having an edge surface thereof forming a curvilinear cam engageable with said other cam follower and defined in part by a curve having tangents thereto increasing in their closest points of approach to the axis of the cam lever pivot as the distance of the tangent points on the curve increases from the axis of the cam lever pivot, said tangents passing on the opposite side of the axis of the cam lever pivot from a line extension of said linear cam, said cam lever having a force transfer surface thereon spaced from the pivot thereof;

an output lever pivoted on said fixed bracket and having a force transfer surface thereon spaced from the pivot thereof and engageable with said cam lever force transfer surface to transmit forces therebetween in surface compression whereby pivotal movement of said cam lever in one arcuate direction caused by linear movement of said input bar to move said other cam followers along said cam lever arm cam surface in a direction away from the cam lever pivot drives said output lever in pivotal movement in one direction about the output lever pivot at an increasing mechanical ratio, said output lever having a parking brake cable tensioning output thereon and a ratchet gear sector;

a lock and release lever pivoted on said fixed bracket and having a pawl resiliently urged into locking ratchet engagement with said gear sector to hold said output lever against pivotal movement in the other direction while permitting it to move in the one direction, and means including said input bar for selectively pivoting said lock and release lever to disengage said pawl from said gear sector to release said output lever.

2. A parking brake actuating mechanism for tensioning a parking brake cable to apply the parking brake, said mechanism comprising:

a fixed bracket having a flange formed thereon defining a substantially linear cam surface;

a push-pull lever movingly secured to said bracket for guided substantially linear movement adjacent to said cam surface and having a handle on one end, a first cam follower roll rotatably mounted on the other end, said first cam follower roll engaging said substantially linear cam surface in rolling relation, and a second cam follower roll rotatably mounted thereon in juxtaposed relation to said first cam follower roll and rotatable relative thereto;

a cam lever pivotally secured to said fixed bracket and having a curvilinear arm extending beside said flange and defining a generally concave curvilinear cam surface engaging said second cam follower roll such that said cam follower rolls are retained between said cam surfaces;

an output lever pivotally secured intermediate the ends thereof to said fixed bracket coaxially with said cam lever and having a toothed ratchet quadrant formed on one end and a parking brake cable attached to the other end and an arm extending laterally through the plane of pivotal movement of said cam lever and operatively engaging an edge of said cam lever to transmit forces therebetween, spring means attached to said output lever and operatively secured to said fixed bracket and continually urging said arm in a pivotal direction; a lock and release lever having one end formed to provide a pawl and being pivotally secured intermediate the ends thereof to said fixed bracket for pivotal movement in a plane substantially parallel to the planes of pivotal movement of said cam lever and said output lever and having spring means acting thereon urging it in one pivotal direction toward engagement of said pawl with said toothed quadrant, the other end of said lock and release lever being in axial alignment with said push-pull lever other end for operative engagement therewith upon sufficient axial movement of said push-pull lever in the push direction and consequent pivoting movement against the force of said spring means acting on said lock and release lever to move said pawl out of engagement with said toothed quadrant;

pulling movement of said push-pull lever causing said cam follower rolls to roll on their respective cam surfaces to force said cam lever to pivot and drive said output lever pivotally to tension said cable at a variable ratio of force transmission, said pawl acting to hold said output lever in a tension position and thereby permitting said push-pull lever to be pushed to a stored position such that the said other end thereof is adjacent said lock and release lever other end, further pushing movement of said push-pull lever causing said lock and release lever to pivot to release said pawl from said toothed ratchet quadrant and thereby releasing the brake actuating tension in said cable.

3. In a variable ratio parking brake control mechanism, a substantially linearly movable input member movable in one direction in a parking brake apply range of movement and movable in the other direction, a pivotally mounted intermediate member having a cam surface, a pivotally mounted output member, said input member having cam follower means thereon engaging said intermediate member cam surface in camming relation during parking brake apply movement of said input member to drive said intermediate member pivotally in arcuate movement in one direction, said intermediate member engaging said output member in force transmitting relation to drive said output member in one direction of arcuate movement to apply a parking brake, and lock and release means associated with said output member and cooperating therewith to selectively lock said output member against arcuate movement in the other direction, said lock and release means being engageable and movable by said input member upon substantially linear movement of said input member within a predetermined range of movement to release said output member, said intermediate member can surface being formed to increase the effective mechanical ratio between said intermediate member and said output member during at least a major portion of the parking brake apply range of movement of said input member.

4. In a variable ratio parking brake control mechanism, a substantially linearly movable input member movable in one direction in a parking brake apply range of movement and movable in the other direction, a fixed support having a substantially linear cam surface formed thereon and guide means cooperating with said input member guiding said input member in substantially linear movement, an intermediate member pivotally mounted on said fixed support and having a cam surface, an output member pivotally mounted on said fixed support, said input member having cam follower means thereon engaging said fixed support cam surface and said intermediate member cam surface in camming relation during parking brake apply movement of said input member to drive said intermediate member pivotally in arcuate movement in one direction, said intermediate member engaging said output member in force transmitting relation to drive said output member in one direction of arcuate movement to apply a parking brake, and lock and release means associated with said output member and cooperating therewith to selectively lock said output member against arcuate movement in the other direction, said lock and release means being engageable and movable by said input member upon substantially linear movement of said input member within a predetermined range of movement to release said output member, said intermediate member cam surface being formed to increase the effective mechanical ratio between said intermediate member and said output member during at least a major portion of the parking brake apply range of movement of said input member.

5. In a variable ratio parking brake control mechanism, a substantially linearly movable input member movable in one direction in a parking brake apply range of movement and movable in the other direction, a fixed support having a substantially linear cam surface formed thereon and guide means cooperating with said input member guiding said input member in substantially linear movement, an intermediate member pivotally mounted on said fixed support and having a cam surface, an output member pivotally mounted on said fixed support, said input member having cam follower means thereon engaging said fixed support cam surface and said intermediate member cam surface in camming relation during parking brake apply movement of said input member to drive said intermediate member pivotally in arcuate movement in one direction, said intermediate member engaging said output member in force transmitting relation to drive said output member in one direction of arcuate movement to apply a parking brake, and lock and release means associated with said output member and cooperating therewith to selectively lock said output member against arcuate movement in the other direction, said lock and release means being engageable and movable by said input member upon substantially linear movement of said input member within a predetermined range of movement to release said output member, said intermediate member cam surface being formed to increase the effective mechanical ratio between said intermediate member and said output member during at least a major portion of the parking brake apply range of movement of said input member, said input member having a full range of movement defined from a released rest position in said one direction for parking brake apply and in said other direction from the released rest position for parking brake release, movement of said input member and therefore said cam follower means in either direction while said cam follower means is in camming engagement with said intermediate member can surface causing pivotal movement of said intermediate member in said one direction of arcuate movement.

6. The mechanism of claim 5, said input member having a projection intermediate the ends thereof, said fixed support having a bar movable transversely of the line of movement of said input member at a point within the parking brake apply range of movement thereof and engaging said input member projection in one condition to prevent further movement of said bar and in another condition being engageable by said input member projection to prevent movement of said input member projection past said bar and in another condition permitting free movement of said input member.

* * * * *

PO-1050
(5/69)

UNITED STATES PATENT OFFICE
CERTIFICATE OF CORRECTION

Patent No. 3,839,924  Dated  October 8, 1974

Inventor(s)  Ernest D. Schaefer

It is certified that error appears in the above-identified patent and that said Letters Patent are hereby corrected as shown below:

Column 2, line 50, the word "pair" should read -- part --.
Column 7, line 36, the word "can" should read -- cam --.
Column 8, line 54, the word "can" should read -- cam --.

Signed and sealed this 31st day of December 1974.

(SEAL)
Attest:

McCOY M. GIBSON JR.
Attesting Officer

C. MARSHALL DANN
Commissioner of Patents